Patented Sept. 12, 1939

2,172,391

UNITED STATES PATENT OFFICE 2,172,391

SUBSTITUTED DIPHENYL COMPOSITIONS

Herbert J. Krase, Anniston, Ala., assignor to Monsanto Chemical Company, St. Louis, Mo., a corporation of Delaware No Drawing. Application June 29, 1936,
Serial No. 87,959

9 Claims. (Cl. 260—649)

This invention relates to alkyl substituted diphenyls and particularly to mixed isomeric alkyl substituted diphenyls.

The compositions herein disclosed are useful as heat transfer media, plasticizers or as ingredients of plasticizing compositions. As plasticizers or softening agents they may be employed in lacquer and varnish compositions to increase compatability of resins and cellulose derivatives.

The compositions herein disclosed are also useful as plasticizers or softening agents for resins generally, particularly for such materials as halogenated rubber of which chlorinated rubber is an example.

The invention herein disclosed is based upon the discovery that short chain alkyl bodies or residues, such as alkyl chlorides or their olefines of not substantially more than five or six carbon atoms may be united with hydrocarbons of the diphenyl type, usually with the assistance of a catalytic agent, to form mixed isomeric substituted diphenyls of the same or different degrees of alkylation which are stable at elevated temperatures and have appreciably lowered freezing points and high boiling points.

The alkyl bodies or residues may comprise either the olefine, the halide or the alcohol. The diphenyl hydrocarbon starting raw material may comprise the hydrocarbon diphenyl, $C_{12}H_{10}$, or partially substituted alkyl diphenyl bodies or chlor diphenyl bodies. The diphenyl bodies herewith considered as operable for the present invention may generally be considered as diphenyl and diphenyl derivatives represented by the formula:

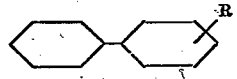

where R may be one or more radicals selected from the class consisting of hydrogen, alkyl, chlorine and bromine.

Upon alkylation of the diphenyl hydrocarbon by the herein described method the product generally obtained may consist of compounds of the type:

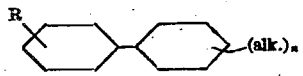

where (alk.) represents an alkyl group of the class consisting of saturated aliphatic hydrocarbon radicals represented by the general formula: $C_nH_{2n+1}$.

As examples of the preparation of the herein disclosed substances the following examples are submitted by way of illustration only:

EXAMPLE I.—*Ethylated diphenyl.*—To 1000 grams of technical molten diphenyl contained in a 1½ liter flask, 150 grams of dry $AlCl_3$ were added and rapidly stirred while passing ethylene gas into the mixture. Approximately 640 grams of ethylene are passed into the reaction chamber over a period of 16 hours, the temperature being maintained at 75° to 85° C. The product is then digested with dilute hydrochloric acid to remove aluminum chloride, washed with water and dried.

In order to obtain a pure product, the crude material as above produced is distilled in a good fractionating column in order to separate the diphenyl. The product desired usually boils over a temperature range of from 280° to 360° C. and is a somewhat viscous amber colored liquid. It does not crystallize when rapidly cooled to −50° C.

EXAMPLE II.—*Amylated diphenyl.*—A mixture of 154 grams of technical diphenyl and 20 grams of $AlCl_3$ is melted in a flask and amylene vapor slowly passed into the molten mass. The temperature is maintained between 85° and 90° C. during the reaction. Approximately 105 grams of amylene vapor were passed into the diphenyl. The reaction mixture becomes a bright lavender color upon introduction of the amylene. Upon solidification, the mass is also lavender in color. The crude product is digested in dilute HCl, washed with water and then dried. The crude product upon standing forms dark brown crystals containing diphenyl. If desired, it may be fractionated for removal of diphenyl.

In place of diphenyl I may utilize substituted diphenyls such as chlor diphenyl, methyl diphenyl and similar products.

The aliphatic hydrocarbons employed to react with the diphenyl may range from ethylene, $C_2H_4$, to amylene or even hexylene. However, for many purposes, where low melting point and stability at high temperatures are important, only the lower alkyl substituted products are preferred. A striking feature of the present invention resides in the fact that whereas diphenyl is high melting and for this reason can be used for heat transfer purposes only under special conditions and when exercizing special precautions, products of my invention are not only of lower melting point but also have a lower vapor pressure at any temperature than has diphenyl itself. This is especially marked in the case of the alkylated diphenyls in which the alkyl groups are of short chain length. I may react the alkyl halide, the olefine or the alcohol with the diphenyl hydrocarbon by suitable means.

The product as obtained by reaction of ethylene with diphenyl is a light yellow, slightly viscous liquid with a boiling point extending up to 360° C. at ordinary pressures and in all probability consists of a mixture of ethylated diphenyl compounds. It retains its fluidity to very low temperatures. The products resulting from alkylations with hydrocarbons of higher molecular weight than ethylene or propylene or mixtures thereof are more viscous and upon standing form wax-like crystals.

Ethylated diphenyl is particularly valuable as a dielectric liquid. It can be prepared free of acid and has been found to possess a flash point of 140° C. and a fire point of 175° C. It is stable at 100° C. and shows a resistivity of 1000 ohms at this temperature.

Alkylated diphenyls for the purpose of the present specification may be defined as mixtures of isomeric and non-isomeric alkyl-substituted compounds having an aromatic residue possessing the diphenyl grouping. The number of alkyl groups present for each aromatic residue will range from one to complete alkylation, in which case for the diphenyl molecule, ten alkyl groups may be present. When the diphenyl residue contains aromatic substituents a correspondingly larger number of alkyl groups may be introduced. For the production of alkylated diphenyls normally liquid, I prefer to employ the low molecular weight alkyl groups.

Reference is made to my co-pending application, Serial No. 133,651, filed on March 29, 1937, wherein is disclosed the use of the herein described mixtures as media for the storage and transfer of heat and to the patent of Carroll A. Hochwalt and Nicholas N. T. Samaras, No. 2,115,524, granted on April 26, 1938, which discloses plastic compositions containing the alkylated diphenyl mixtures of my invention.

What I claim is:

1. A normally liquid product consisting of a mixture of alkylated diphenyl derivatives having less than six carbon atoms in the alkyl groups obtained by direct alkylation in the presence of a Friedel-Crafts catalyst of a material selected from the group consisting of diphenyl, hydrogenated diphenyl, chlorinated diphenyls and brominated diphenyls, with an alkylating agent selected from the group consisting of olefines, alcohols and alkyl halides having less than six carbon atoms in the molecule.

2. A normally liquid product consisting of a mixture of alkylated diphenyls having less than six carbon atoms in the alkyl groups obtained by direct alkylation of diphenyl in the presence of a Friedel-Crafts catalyst with an alkylating agent selected from the group consisting of olefines, alcohols, and alkyl halides having less than six carbon atoms in the molecule, said product being characterized in that it contains substantial proportions of hydrocarbons having boiling points in excess of 300° C.

3. A normally liquid product consisting of a mixture of alkylated diphenyls obtained by direct alkylation of diphenyl in the presence of a Friedel-Crafts catalyst with an aliphatic olefine having less than six carbon atoms in the molecule, said product being characterized in that it contains substantial proportions of hydrocarbons having boiling points in excess of 300° C.

4. A normally liquid product consisting of a mixture of alkylated diphenyls obtained by direct alkylation of diphenyl in the presence of a Friedel-Crafts catalyst with a normally gaseous aliphatic olefine having less than six carbon atoms in the molecule, said product being characterized in that it contains substantial proportions of hydrocarbons having boiling points in excess of 300° C.

5. A normally liquid product consisting predominantly of a mixture of ethylated diphenyls obtained by direct alkylation of diphenyl in the presence of a Friedel-Crafts catalyst with ethylene, said product being characterized in that it consists predominantly of a fraction having a boiling range between 280° and 360° C. and does not crystallize at −50° C.

6. A normally liquid product consisting predominantly of a mixture of propylated diphenyls obtained by direct alkylation of diphenyl in the presence of a Friedel-Crafts catalyst with propylene, said product being characterized in that it contains substantial proportions of hydrocarbons having boiling points in excess of 300° C.

7. A normally liquid product consisting predominantly of a mixture of amylated diphenyls obtained by the direct alkylation of diphenyl in the presence of a Friedel-Crafts catalyst with amylene, said product being characterized in that it contains substantial proportions of hydrocarbons having boiling points in excess of 300° C.

8. A normally liquid product as defined in claim 1 and further characterized in that it is obtained by direct alkylation with ethylene.

9. A normally liquid product as defined in claim 1 and further characterized in that it is obtained by direct alkylation with propylene.

HERBERT J. KRASE.

CERTIFICATE OF CORRECTION.

Patent No. 2,172,391. September 12, 1939.

HERBERT J. KRASE.

It is hereby certified that error appears in the printed specification of the above numbered patent requiring correction as follows: Page 2, first column, line 50, claim 1, for the word "diphenyl" read diphenyls; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.